(12) United States Patent
Mullins

(10) Patent No.: US 11,737,437 B1
(45) Date of Patent: Aug. 29, 2023

(54) DELAYED RELEASE DEVICE WITH EXPENDABLE LINKAGE FOR TEMPORARILY STORING AND RESTRAINING THE BUOY LINE AND BUOYS OF A SHELLFISH OR FISH TRAP OR THE LIKE, BENEATH THE SEA SURFACE FOR A PREDETERMINED TIME INTERVAL

(71) Applicant: Russ Mullins, Ferndale, WA (US)

(72) Inventor: Russ Mullins, Ferndale, WA (US)

( * ) Notice: Subject to any disclaimer, the term of this patent is extended or adjusted under 35 U.S.C. 154(b) by 85 days.

(21) Appl. No.: 17/570,733

(22) Filed: Jan. 7, 2022

(51) Int. Cl.
*A01K 69/04* (2006.01)
*A01K 71/00* (2006.01)
*A01K 73/00* (2006.01)
*A01K 75/04* (2006.01)
*A01K 75/00* (2006.01)

(52) U.S. Cl.
CPC .............. *A01K 69/04* (2013.01); *A01K 71/00* (2013.01); *A01K 73/00* (2013.01); *A01K 75/04* (2013.01); *A01K 75/00* (2013.01)

(58) Field of Classification Search
CPC ........ A01K 69/04; A01K 71/00; A01K 73/00; A01K 75/04
See application file for complete search history.

(56) References Cited

U.S. PATENT DOCUMENTS

| | | |
|---|---|---|
| 3,426,472 A | 2/1969 | Richard |
| 3,724,120 A | 4/1973 | Richard |
| 3,772,818 A | 11/1973 | Gardina |
| 4,136,415 A | 1/1979 | Blockburger |
| 4,262,379 A | 4/1981 | Jankiewicz |
| 6,261,142 B1 | 7/2001 | Fiotakis |
| 7,534,152 B1 | 5/2009 | Lloyd et al. |

*Primary Examiner* — Jessica B Wong

(57) ABSTRACT

An apparatus that secures the buoy line and buoy to the top of the shellfish trap in an orderly manner until a galvanic timed release (GTR) coupling parts and releases the buoy to the sea surface. The GTR is a highly corrosive anode link which breaks after a predetermined period of immersion in seawater. After the GTR link breaks, the apparatus automatically releases the buoy. The unrestrained buoy rises to the surface so that the trap may be recovered. Until this time, marine mammals are protected from entanglement in the vertical buoy line. It is important that the buoy and, perhaps more importantly, the line associated with it, are packaged in a way to prevent fouling of the buoy lines. By design, the apparatus prevents the fouling of the buoy line that would result in the possible loss of the entire gear set.

6 Claims, 4 Drawing Sheets

DELAYED RELEASE DEVICE WITH EXPENDABLE LINKAGE FOR TEMPORARILY STORING AND RESTRAINING THE BUOY LINE AND BUOYS OF A SHELLFISH OR FISH TRAP OR THE LIKE, BENEATH THE SEA SURFACE FOR A PREDETERMINED TIME INTERVAL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to devices for the deployment of buoys and lines and particularly to devices for the deployment of buoys and lines for use with crab and other shellfish and fish traps.

2. Description of the Prior Art

Shellfish traps and the like lie on the ocean floor and their recovery is effected by means of a vertical line connected to a surface float or buoy. Often the buoy line is required to pull loads exceeding 2000 lbs. because shellfish gear can become buried in sand or hung up on other obstacles that require extreme force in order to dislodge and recover the trap. The surface float is almost essential for the location and recovery of the trap. However, the existence of vertical buoy lines in the water column and the associated exposed surface buoys has led to widespread large whale and sea turtle entanglement issues that have unacceptably high mortality rates. The widespread use of vertical buoy lines and the associated harm to protected species has led to the premature closure of multi-million-dollar shellfish fisheries.

To address this problem several devices have been invented that allow a buoy attached to a fish trap to be released after some time interval, or by radio control. Some examples of these devices are found in the following U.S. Patents. U.S. Pat. No. 3,426,472 to Richard teaches an alloy link that is designed to corrode in salt water over a certain time period. The buoy is suspended just above the trap with the link restraining the buoy to keep it near the trap. Once the link corrodes through, the buoy is free to rise to the surface where it can be recovered. Different alloys produce different break times so any delay up to 14 days can be selected. U.S. Pat. No. 3,724,120 to Richard teaches an improved devise for releasing buoys that uses an anode and cathode. The cathode can be reused, while the anode is destroyed. U.S. Pat. No. 4,126,415 to Blockburger teaches an underwater release mechanism for a shackle including a shaft releasably journaled in a casing and held in position by a frangible link to be spring biased to release a shackle hook upon remote actuation by a radio signal, causing the link to fracture whereby the shackle is released, and the release mechanism floats to the surface. A rope canister can be attached to the casing with one end of the rope tied to the shackle whereby after release the canister end of the rope is tied to the float to mark the spot of the shackle. U.S. Pat. No. 4,262,379 to Jankiewicz teaches a marker buoy attached to an object such as a lobster or crab trap by a latch and released by a trigger struck by a falling weight. A sealed buoy compartment contains a first permanent magnet holding the weight in upper position by a supportive pole relationship to the poles of a second permanent magnet on the weight and releasing the weight when the first magnet is pivoted to a relative position of poles not sufficiently supportive of the weight. The first magnet is pivoted by an electric motor controlled by an electric clock (or an optional radio signal). Setting of the clock and other operations are accomplished without disturbing compartment seals by an external hand-held magnet operating on internal magnetic reed switches. A line tethers the buoy to the object when the latch is released. U.S. Pat. No. 6,261,142 to Fiotakis teaches a buoy that has a release mechanism that permits the buoy to be automatically released to ascend to the surface. The release unit may be operated by a remotely transmitted signal or initiated directly by a timer or a controller where specific circumstances dictate. U.S. Pat. No. 7,534,152 to Lloyd et al. teaches an underwater buoy release system having a moment arm release system. The moment arm release system has a magnetically attractive arm structure connected to a buoy. The buoy release system further includes an electromechanical device that moves the magnetically attractive elements toward, and away from, the magnetically attractive arm structure. The buoy release system further includes a signal reception device, wherein the signal reception device that receives a remote signal from a transmission device.

Note that the latter group of patents all rely on internal clocks or radio devices. This requires complex components and effective seals that can withstand the pressure of the deep waters in which the crab pots or other fish traps are set. In addition, they require specialized buoy lines that are not typically used in shellfish and fish pot fisheries.

BRIEF DESCRIPTION OF THE INVENTION

The instant invention overcomes the difficulties described above. The invention relates to improved techniques and apparatus for setting and recovering shellfish traps and the like. More specifically, the invention relates to a method and means for storing the buoy line and buoy on the top of the shellfish trap or like beneath the surface of the water for a predetermined period of time after setting. Unlike the designs above, the instant invention works by keeping the buoy and associated lines in a compact package as part of the overall trap. This keeps everything in a neat form until it is time to release the buoy.

In addition, the instant invention employs traditional commercial fishing buoy line and buoys which ensures the most durable and practical buoy lines and buoys can be used. Fishers are not required to replace expensive buoy lines or use buoy lines with inferior durability or mechanical functionality.

The storage and release device of the instant invention consists of an apparatus that secures the buoy line and buoy to the top of the shellfish trap until a galvanic timed release (GTR) coupling parts and releases the buoy to the sea surface. The GTR is a highly corrosive anode link which breaks after a predetermined period of immersion in seawater. After the GTR link breaks, the apparatus automatically releases the buoy. The unrestrained buoy rises to the surface so that the trap may be recovered. The present invention achieves the critical requirement that the buoy line and buoy be constrained by the apparatus in such a manner that it cannot become fouled, tangled or otherwise compromised by current or debris to the point where the buoy is not capable of reaching the surface. A smooth and controlled release of the buoy line is required to avoid fouling. Thus, it is important that the buoy and, perhaps more importantly, the line associated with it, are packaged in a way to prevent fouling of those lines. Otherwise, even if the buoy were released, fouled lines would not let it reach the surface, resulting in the possible loss of the entire gear set.

DETAILED DESCRIPTION OF THE INVENTION

The principal object of the present invention is to provide a method and means for restraining the buoy line and buoy of a shellfish trap or the like beneath the surface of the water for a predetermined period of time and then, have the buoy line and buoy be deployed in such a manner that trap can be dependably recovered. A GTR link is provided which breaks after a predetermined period of immersion thus allowing the buoy and buoy line to be released from the apparatus in order to rise to the surface. Any desired delay time between a few hours and several days can be provided using specific GTRs. During the selected delay time, the apparatus eliminates vertical lines and surface buoys which are known to harm large whales and other protected species. The fisherpersons are able to plan their trap set and recovery cycles around their selected release periods so that the trap recovery takes place as soon as possible after the emergence of the surface buoy.

Figure 1:
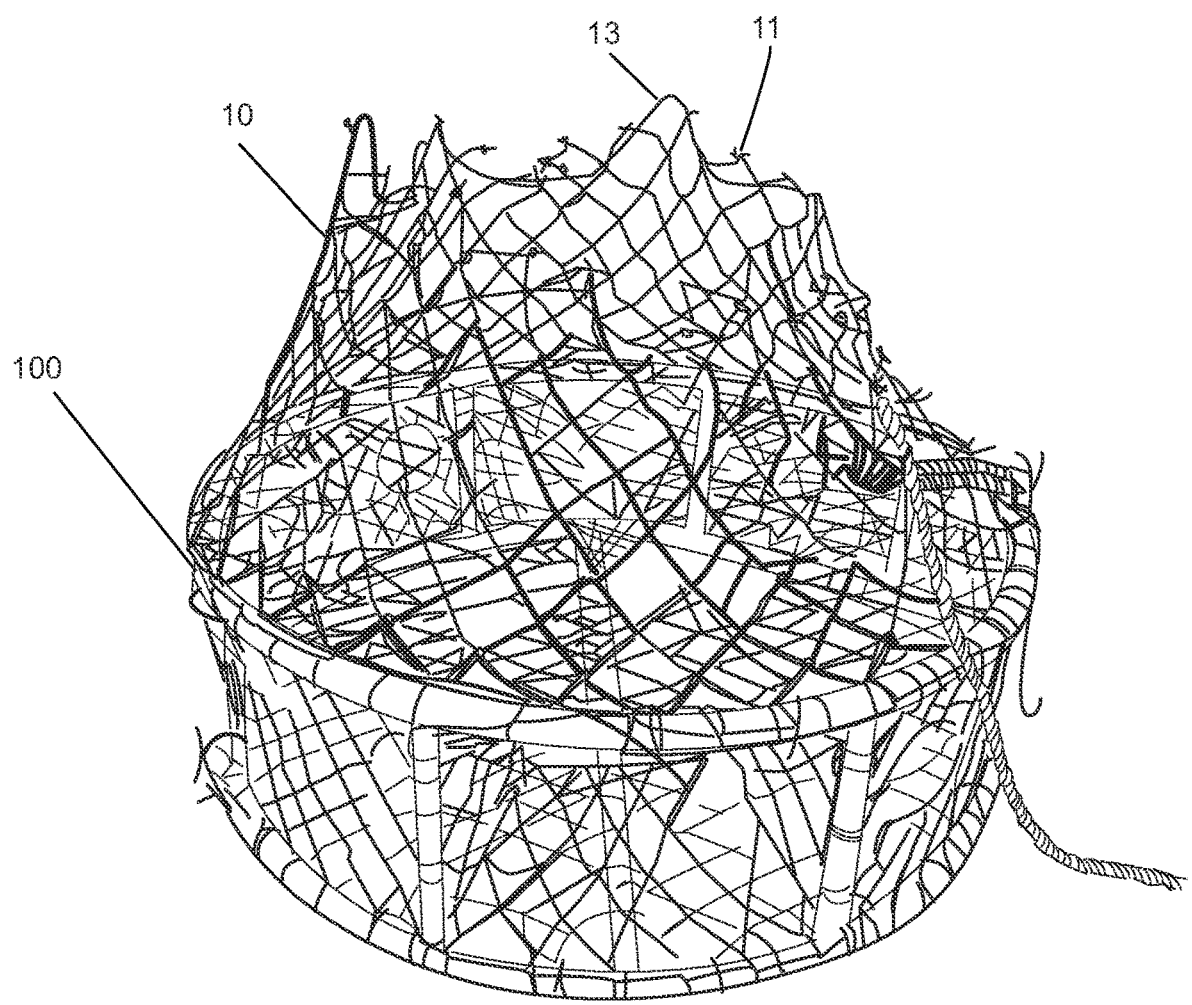
FIG. 1 is a perspective view of a crab pot showing the retention device with the buoy line and buoy having been deployed and not shown.
Figure 1A:
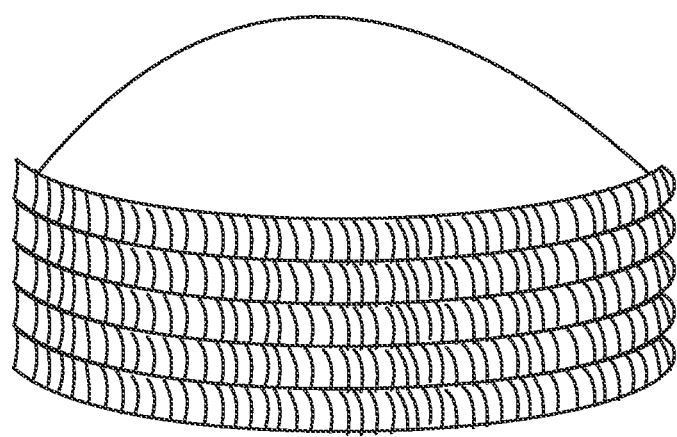
FIG. 1*a* is a detail view of a buoy and a coil of buoy line packed for placement in the net pocket.

The present invention is designed to retrofit all standard commercial-style, circular, crab traps 100 ranging from 38 inches to 42 inches in diameter. See, e.g., FIG. 1. The primary component of the apparatus consists of custom-sized piece of 2-inch mesh size, high density polyethylene trawl net material 10. In the preferred embodiment, the piece of net material is 126 inches long and 18 inches wide. One long edge 11 of the net 10 is permanently attached to the existing crab trap 100 along the upper frame of the crab trap around the full circumference of the trap, as shown in FIG. 1. The 18-inch ends of the net material 12 are sewn together with twine or other durable material. This creates a net pocket 13 on top of the crab pot that will retain the buoy line and buoy until deployment. FIG. 1*a* shows a buoy 15 held in place inside a coil of buoy line 16. This set is then set inside the net pocket 13, as discussed below.

Note that, although the figures and text show a circular crab pot, the net pocket can be attached to square pots as well as any other shaped pots. As long as the net pocket fits the shape of the pot and is properly secured to the top of the pot.

Figure 2:
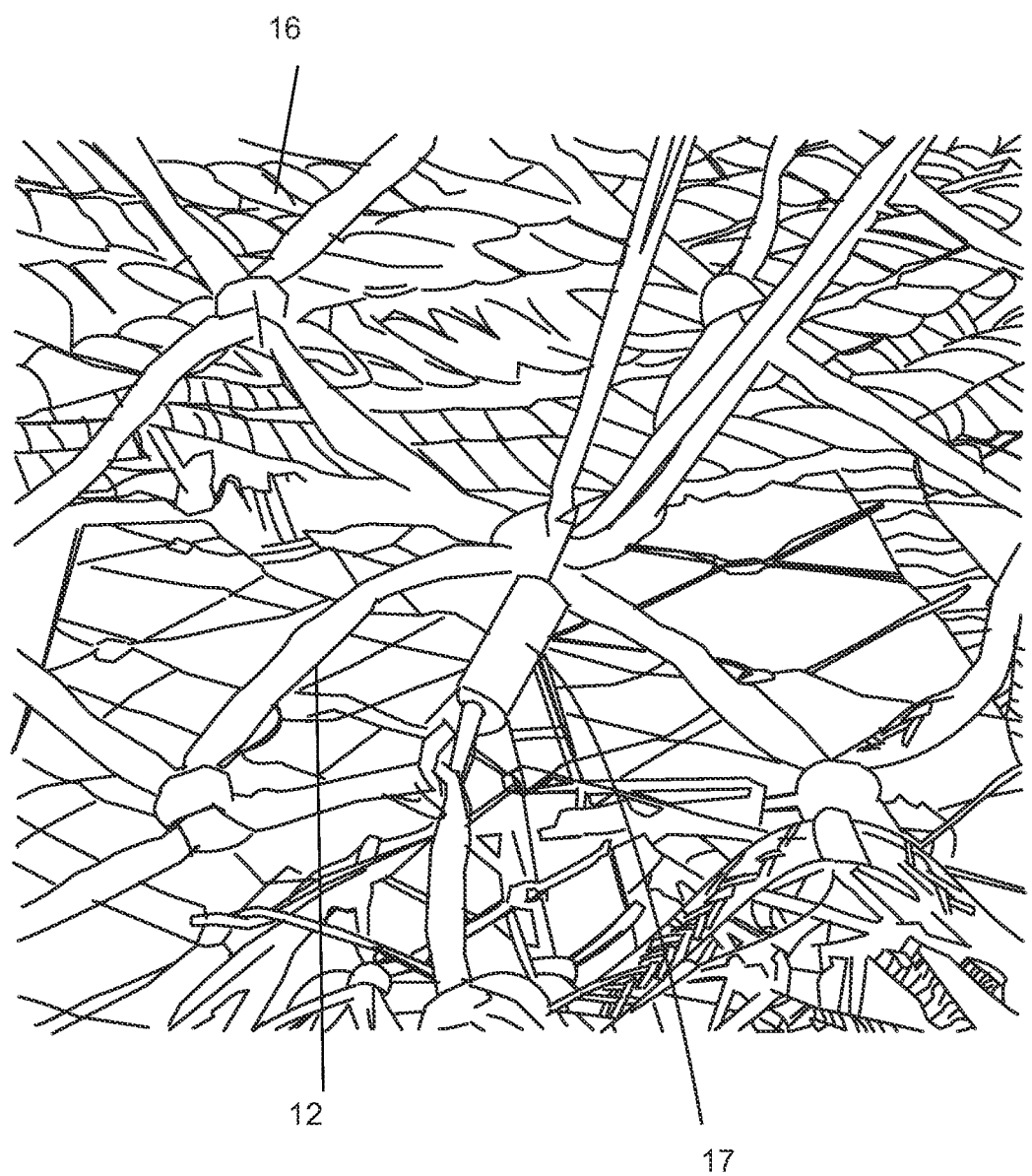
FIG. 2 is a detail view of a drawstring attached to the fixed mesh of the apparatus showing the GTR and the invention ready for deployment.

FIG. 2 is a detail view of a drawstring 14 attached to the fixed mesh of the net pocket 13 showing the GTR 17 and the invention ready for deployment. Note how the GTR has hooked two parts of the drawstrings with hook 18*a* and 18*b*. Once the GTR 18 releases, the drawstring 14 opens and the buoy and line can be released.

Figure 3:
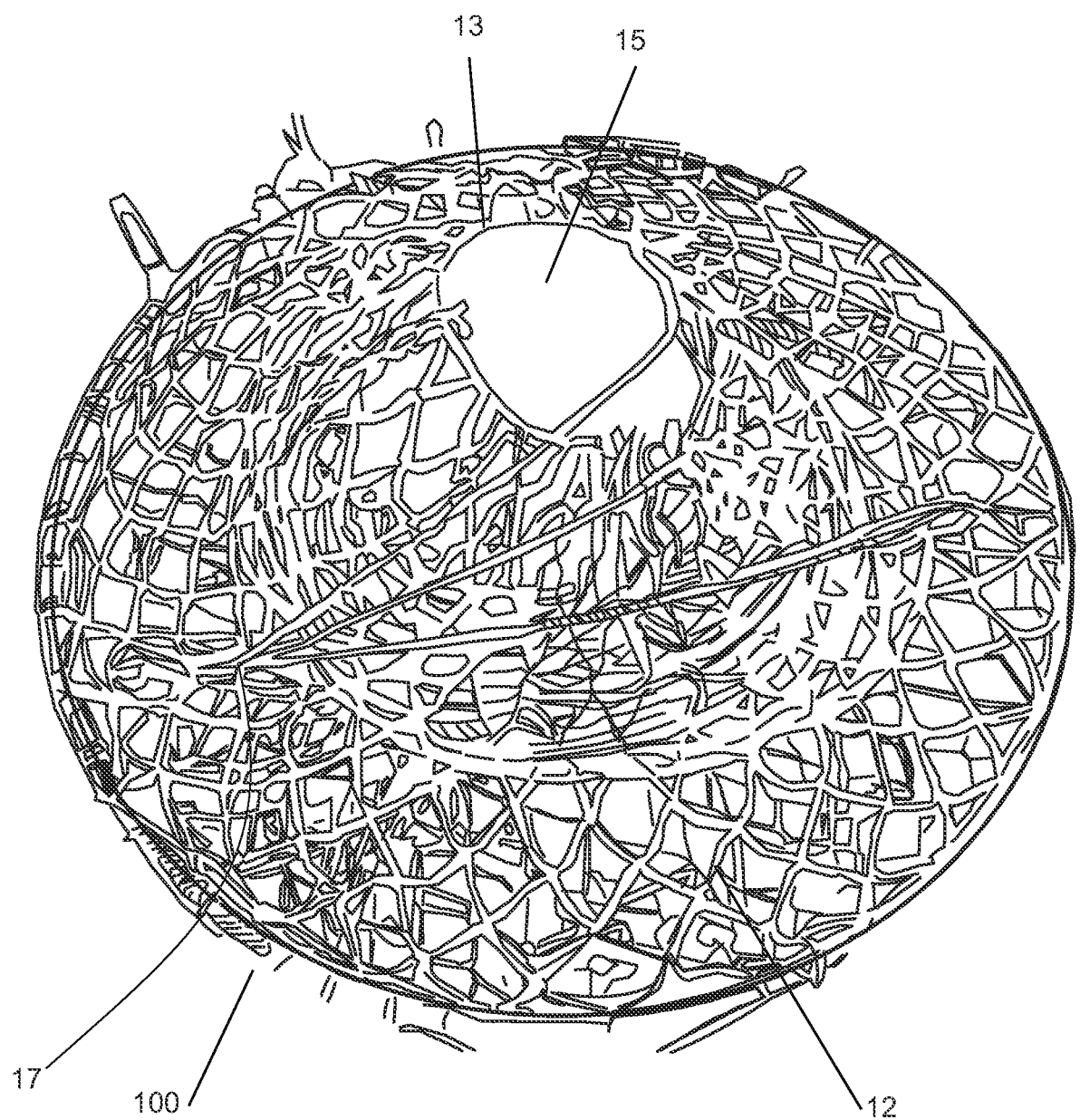
FIG. 3 is a top perspective view of a crab pot showing the retention device fully rigged and ready for deployment.

As shown in FIG. 3, a durable nylon drawstring 14 is woven between the net meshes so that when drawn tight it causes the net pocket 13 to draw tight and retain the buoy line 16 and buoy 15 within the net pocket 13 on top of the trap. The apparatus holds the spherical buoy securely inside the center of the coil of buoy line 16 (see FIG. 1*a*). This feature prevents the buoy line coil 16 from becoming disorganized and potentially fouled prior to buoy 15 deployment. A GTR link 17 (see also FIG. 2) is used to retain tension on the drawstring and prevent deployment of the buoy and buoy line. Once the GTR link 17 parts, the drawstring relaxes, and the buoy is released pulling the buoy line to the surface. The apparatus keeps the coil of buoy line contained to the point where currents will not cause it to foul as the line is pulled to the surface by the buoy.

Once the buoy has reached the surface at the predictable time, it can be retrieved by the fisherpersons. Until the buoy reaches the surface, the shellfish gear poses no threat to protected marine species as a result of vertical line entanglement.

The apparatus uniquely requires a hard plastic buoy 16 that is rated for extreme depths. Conventional foam buoys can compress at depth, lose flotation and lead to permanent loss of the trap.

The present invention uniquely provides an effective means of dependably eliminating vertical lines and surface buoys. In addition, the apparatus has design features that make the invention economically viable in shellfish fisheries. Since commercial fishing is a very dynamic and competitive endeavor, manipulation of traps prior to redeployment must be non-complex, reasonably quick and inexpensive. The present invention achieves all three of these requirements through its design and execution.

When trap buoy line is retrieved, it is generally coiled in an orderly fashion mechanically or by hand. The present invention opens to allow the coil of buoy line to be placed on top of the trap with the buoy end of the line being on the top of the coil and the trap end of the line being on the bottom of the coil. The buoy is then placed at the center of the line coil prior to being secured in place by the apparatus. The drawstring that holds the apparatus closed prior to deployment is permanently secured to the apparatus. When the fisherman secures the buoy line and buoy inside the apparatus, they pull the drawstring to where it is tightly held to the apparatus mesh by the selected GTR link. The act of tightening the drawstring is by design, simple and quick to accomplish. Once the present invention is rigged, it can be deployed from a boat in the typical manner.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for use with a fish trap having a top surface comprising:

a) a net, having a bottom perimeter and an open top, said bottom perimeter of said net being fixedly attached to the top surface of said fish trap, said net forming a pocket on the top surface of said fish trap;

b) a drawstring, attached to said open top such that said top is open in a first position and closed in a second position;

c) a buoy line, having a proximate end and distal end, said proximate end being attached to said fish trap, coiled and stored in said net;

d) a buoy, attached to the distal end of said buoy line, said buoy being stored in said net; and e) a galvanic link, attached to said drawstring when said drawstring is in said second position, thereby enclosing said buoy and buoy line in said net.

2. The device of claim 1 wherein the galvanic link dissolves in seawater after a period of time.

3. The device of claim 1 wherein the fish trap is circular.

4. A method of deploying a fish trap having top surface, a net, having a bottom perimeter and an open top being fixedly attached to the top surface of said fish trap forming a pocket on the top surface of said fish trap, a drawstring, attached to said open top such that said top is open in a first position and closed in a second position, a buoy line, having a proximate end and distal end, a buoy, attached to the distal end of said buoy line, and a galvanic link, comprising the steps of:

a) placing the buoy line in said pocket of said net and securing it to the top of the fish trap;

b) placing the buoy atop the buoy line;

c) pulling the drawstring tight around said buoy, thus closing the net;

d) securing the drawstring with said galvanic link; and e) placing said fish trap in an ocean containing seawater.

5. The method of claim 4 wherein the galvanic link dissolves in seawater after a period of time.

6. The method of retrieving a fish trap deployed in claim 5 comprising the steps of:

a) waiting for said galvanic link to dissolve;

b) releasing the drawstring by the force of the buoyancy of the buoy;

c) allowing the buoy and the buoy line to escape from said net;

d) observing said buoy on the surface of the ocean;

e) retrieving said buoy and said fish trap.

\* \* \* \* \*